Sept. 29, 1970 | P. S. HUBER ET AL | 3,530,967
BALL TRANSFER TILE
Filed Sept. 24, 1968
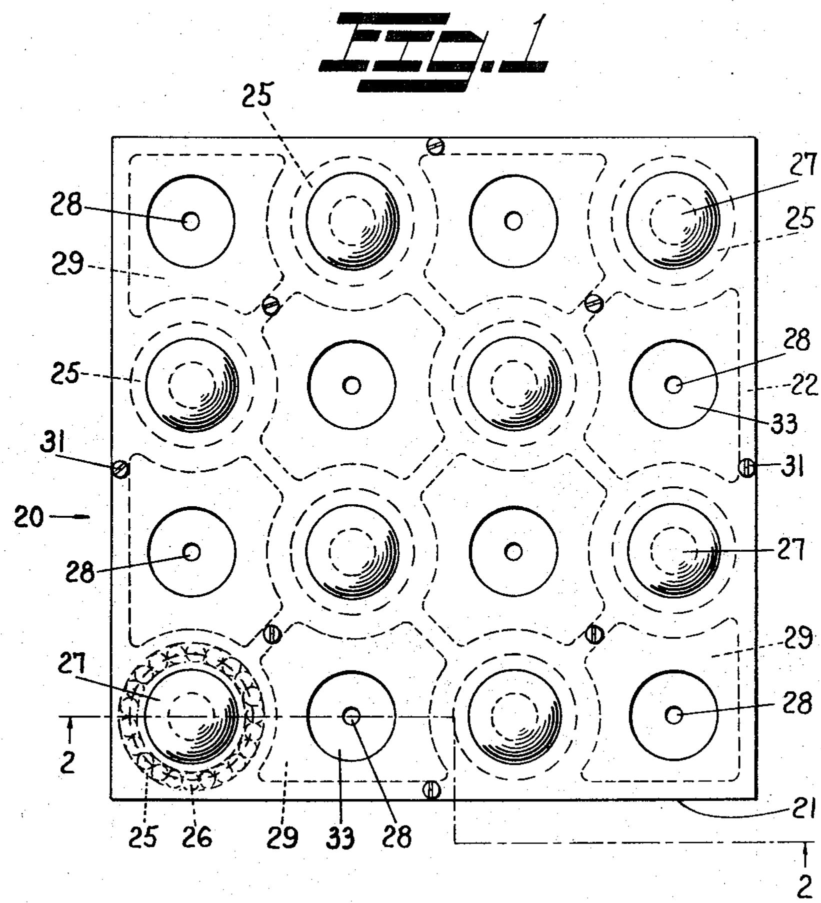
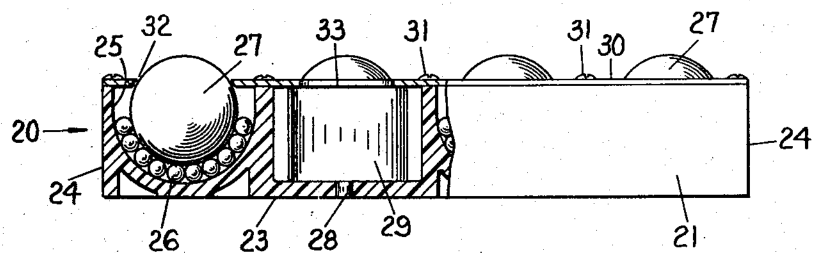
INVENTOR
PAUL S. HUBER
GUTHRIE B. STONE
BY Albert O. Mahassel
ATTORNEY United States Patent Office 3,530,967

Patented Sept. 29, 1970

3,530,967

BALL TRANSFER TILE

Paul S. Huber and Guthrie B. Stone, Honeoye, N.Y., assignors to Stone Conveyor Company, Inc., Honeoye, N.Y., a corporation of New York Filed Sept. 24, 1968, Ser. No. 762,004

Int. Cl. B65g *13/00;* F16c *19/10*

U.S. Cl. 193—37 4 Claims

ABSTRACT OF THE DISCLOSURE

A molded tile-like housing for a plurality of plastic ball bearing transfer units which are retained for free rotation by an overlying surface plate.

BACKGROUND OF THE INVENTION

This invention pertains to conveyor surfaces of the rollerway type by which heavy or bulky articles and containers are easily moved upon series of partially imbedded ball bearings. The invention relates to improvements in the arrangement of such ball bearings whereby a molded housing contains a plurality of ball transfer members which may be applied as a unit. The molded housing is formed as a rectangle and has a flat under surface in the general shape of a floor tile. A number of such housings may be easily applied to cover a given surface and all of the ball bearings will provide support on a common plane. The invention combines plastic transfer balls with pluralities of plastic ball bearings in spherical raceways formed within a molded plastic housing.

The use of ball transfers of the prior art has necessitated large quantities being applied to cover sizable areas. This application has been difficult and expensive in order to place all at a common height. Various means for capping or covering the units in a manner to permit the transfer balls to project upwardly has added greatly to the expense. With the instant invention a number of ball transfers may be applied to a floor or table as a unit and many units, when comined, will cover an area easily and inexpensively.

SUMMARY OF THE INVENTION

It is the object of this invention to provide a molded plastic transfer housing in the general formation of a floor tile which shall contain a number of plastic ball bearing transfer members.

It is a further object of the invention to provide a transfer housing as above which may be easily fastened to any flat surface and when applied in quantity in abutting relationship will cover large areas.

It is another object of the invention to combine the advantages of plastic bearings and plastic raceways with the further advantages of uniting many transfer bearings within a single preformed housing.

The transfer tiles of the invention are easily applied to tables, floors or platforms by mechanical fasteners or adhesives and large areas are quickly converted to a rollerway surface with the ball bearings in a common plane. Further advantages include light weight, low friction, low inertia, and long wearing qualities.

BRIEF DESCRIPTION OF THE DRAWING

The invention will be described by reference to a specific embodiment thereof as illustrated in the accompanying figures of drawing, wherein:

FIG. 1 is a plan view of a ball transfer tile of the invention; and

FIG. 2 is a sectional elevation taken on line 2—2 in FIG. 1.

DESCRIPTION OF THE PREFERRED EMBODIMENTS

Now referring to the drawing, a ball transfer tile generally designated 20, is shown in FIG. 1 as a square whose size might vary depending upon space requirements and load conditions. A suitable tile for average loading might be nine inches on a side and arranged as in FIG. 1. The tile is formed with a molded plastic housing 21 as a single unit. The housing 21 has an upper surface 22 and a lower surface 23 which lie in parallel planes separated by vertical side walls 24 on all four sides. The upper surface 22 contains a number of upwardly directed sockets 25 aligned in a suitable geometric form such as that shown in FIG. 1. The sockets 25 are semi-spherical in shape for receiving a plurality of plastic ball bearings 26 which support in each socket a plastic transfer ball 27 of relatively larger diameter. Each transfer ball 27 is rotatable upon its supply of ball bearings 26 which roll within the confines of the socket 25 and about its upper periphery in a manner known in this art. A segment of each transfer ball 27 is elevated a common distance above the upper surface 22 for providing a supporting plane for material to be moved.

Spaced at intervals about the tile are a number of fastening holes 28 extending through the lower surface 23 at hollowed areas 29 for securing the tile to floors or work areas.

A surface plate 30 of metal such as steel or aluminum covers the entire upper surface 22 and is fastened thereto by screws 31. Apertures 32 in the plate 30 overlie each transfer ball 27 as shown in FIG. 2. Also holes 33 in the plate 30 are in position to index above each fastening hole 28 as a means for applying lag screws or other mechanical fasteners. In certain cases it may be desirable to secure the tiles by using adhesives as with ordinary floor tiles.

The combination of materials which make up the transfer tile of this invention has been found to be most advantageous for most applications, however other plastics could be substituted. It is recommended that the housing 21 be molded from delrin and the ball bearings made from polyethylene. The larger transfer ball should be polypropylene. This combination provides the advantages of low inertia, light weight, corrosion resistance, and the possibility of molding and retaining close tolerances in the raceway areas. The invention offers ball transfer bearings in prearranged groups which are economical to manufacture and simple and quick to apply.

We claim:

1. A ball transfer tile comprising (a) a plastic housing of unitary construction and having a plurality of outwardly directed semi-spherical sockets formed therein, (b) each one of said sockets containing a plurality of plastic ball bearings, (c) a plastic transfer ball rotatively supported on said bearings in each one of said sockets, and (d) a surface plate stationarily and removably fixed to said housing having apertures adapted to at least partially overlie each of said transfer balls with the periphery of the balls extending above the surface plate.

2. The transfer tile as defined in claim 1 wherein said housing is molded as a unit with said sockets forming as semi-spherical raceways opening upon a first surface of said housing, and a second surface of said housing lying in a single plane and parallel with said first surface.

3. The transfer tile as defined in claim 2 wherein said surface plate substantially completely covers said first surface of said housing.

4. The transfer tile as defined in claim 3 wherein said housing includes fastener openings extending between said first and second surfaces, said first surface having a plurality of hollow areas disposed between said sockets, said openings being disposed in said hollow areas, said surface plate having openings therein aligned with the hollow areas to provide access to fasteners received in the fastener openings.

References Cited

UNITED STATES PATENTS

| | | |
|---|---|---|
| 1,963,956 | 6/1924 | Craig. |
| 2,931,477 | 5/1960 | Metzgar. |
| 2,949,992 | 8/1960 | Weinberg. |
| 3,086,826 | 4/1963 | Gunnell. |
| 3,089,221 | 5/1963 | Barr. |
| 3,254,530 | 6/1966 | Ohringer ---------- 308—6 X |

FOREIGN PATENTS

| | | |
|---|---|---|
| 611,545 | 12/1960 | Canada. |
| 632,467 | 12/1961 | Canada. |

FRED C. MATTERN, Jr., Primary Examiner

U.S. Cl. X.R.

308—6